US012730656B2

(12) United States Patent
Tessarolo et al.

(10) Patent No.: US 12,730,656 B2
(45) Date of Patent: Sep. 8, 2026

(54) DETERMINISTIC CYCLE ACCURATE EXECUTION OF SOFTWARE

(71) Applicant: TEXAS INSTRUMENTS INCORPORATED, Dallas, TX (US)

(72) Inventors: Alexander Tessarolo, Lindfield (AU); Venkatesh Natarajan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 162 days.

(21) Appl. No.: 18/731,132

(22) Filed: May 31, 2024

(65) Prior Publication Data

US 2025/0021345 A1 Jan. 16, 2025

(30) Foreign Application Priority Data

Jul. 12, 2023 (IN) ............................ 202341046732

(51) Int. Cl.
*G06F 9/445* (2018.01)
*G06F 13/24* (2006.01)

(52) U.S. Cl.
CPC .......... *G06F 9/44505* (2013.01); *G06F 13/24* (2013.01)

(58) Field of Classification Search
CPC ....... G06F 13/24; G06F 9/445; G06F 9/44505
See application file for complete search history.

(56) References Cited

U.S. PATENT DOCUMENTS

| | | | | |
|---|---|---|---|---|
| 5,239,641 | A | 8/1993 | Horst | |
| 2001/0027533 | A1* | 10/2001 | Inomata | G06F 13/24 713/400 |
| 2007/0005842 | A1* | 1/2007 | Sohm | G06F 11/3648 710/62 |
| 2011/0016295 | A1 | 1/2011 | Catherwood | |
| 2013/0111092 | A1* | 5/2013 | Heller | G06F 13/24 710/267 |
| 2017/0262393 | A1* | 9/2017 | Takaki | G06F 1/3203 |
| 2022/0197780 | A1 | 6/2022 | Peck et al. | |
| 2023/0221959 | A1 | 7/2023 | Langadi et al. | |
| 2023/0244489 | A1* | 8/2023 | Tran | G06F 9/321 712/205 |

OTHER PUBLICATIONS

International Search Report for PCT/US2024/037780 dated Oct. 28, 2024.

* cited by examiner

*Primary Examiner* — Phong H Dang
(74) *Attorney, Agent, or Firm* — Michelle Murray; Frank D. Cimino

(57) ABSTRACT

Various embodiments include systems and methods to provide deterministic execution times for computer processors. In one example, a hardware module may include hardware logic, which is configured to track a value stored in a counter. The hardware module may detect a read or write access request from a processor, determine whether the value stored in the counter has reached a specified value, and then stall the processor using a hardware signal in response thereto. Once the counter reaches the specified value, the hardware logic may then un-stalls the processor using the hardware signal.

20 Claims, 4 Drawing Sheets

DETERMINISTIC CYCLE ACCURATE EXECUTION OF SOFTWARE

CROSS-REFERENCE TO RELATED APPLICATIONS

This application claims priority to Indian patent application Ser. No. 202341046732, filed Jul. 12, 2023, and entitled "DETERMINISTIC CYCLE ACCURATE EXECUTION OF SOFTWARE," the contents of which are incorporated by reference in their entirety.

TECHNICAL FIELD

Various embodiments are directed generally to computer processor execution times and, more specifically, to systems and methods to provide deterministic execution times for some tasks.

BACKGROUND

Computer interrupts are a mechanism that enable a computer's central processing unit (CPU) to efficiently handle and prioritize various tasks and events. When a computer is running, it continually monitors external and internal signals, such as hardware devices requesting attention or software-generated signals. When an interrupt occurs, the CPU temporarily suspends its current task, saves its state, and shifts its focus to the interrupt handler, a specific routine designed to address the interrupt's cause. Interrupts can be categorized into two main types: hardware interrupts, generated by external devices like keyboards or network cards, and software interrupts, triggered by specific software instructions. The CPU's ability to manage and respond to these interruptions in real-time allows modern computers to multitask effectively and provide responsive, interactive user experiences.

In one example, a CPU executes code causing the CPU to read a register in response to an interrupt. However, the time it takes for the CPU to suspend execution, save state, and shift to the interrupt handler may take a quantity of CPU clock cycles that varies, even for a same interrupt type. In another example, a piece of software code may include branching instructions, and a number of CPU clock cycles to complete execution may vary, depending on results of the branching instructions. Such execution times may be referred to as non-deterministic. Non-deterministic execution times may pose a challenge for real-time execution.

There is a need in the art for efficient techniques to provide deterministic execution times.

SUMMARY

In an example embodiment, an apparatus includes: a processor core configured to execute machine code instructions over a plurality of clock cycles and to receive a hardware signal; and a circuit coupled to the processor core, wherein the circuit includes a counter, wherein the circuit is configured to generate the hardware signal and is further configured to: change a value stored in the counter by either incrementing or decrementing the value according to a clock associated with the clock cycles; receive a read operation, directed to the counter, from the processor core; in response to receiving the read operation, determine the value stored in the counter; determine whether to change a state of the hardware signal based at least in part upon the value stored in the counter; and change the state of the hardware signal to a first state.

In another example embodiment, a method includes: initiating a counter; receiving a read operation from a processor core, wherein the read operation is directed to the counter; stalling the processor core, including causing a hardware signal to attain a first state, in response to the read operation from the processor core, wherein the hardware signal is transmitted on a bus from a hardware logic unit to the processor core; holding the first state of the hardware signal during a time period in which the counter performs a counter operation; and causing the hardware signal to attain a second state, thereby un-stalling the processor core, in response to the counter reaching a specified value.

In yet another example embodiment, an apparatus includes: a hardware counter circuit, coupled to a first bus, wherein the first bus comprises a data bus configured to support read and write access to the hardware counter circuit from a processing unit; and hardware logic coupled to the hardware counter circuit and to a second bus, wherein the second bus is coupled to the processing unit, further wherein the hardware logic is configured to assert and de-assert a hardware signal on the second bus in response to a value of the hardware counter circuit at a read operation on the first bus.

BRIEF DESCRIPTION OF THE DRAWINGS

Reference will now be made to the accompanying drawings, wherein.

DETAILED DESCRIPTION

Figure 1:
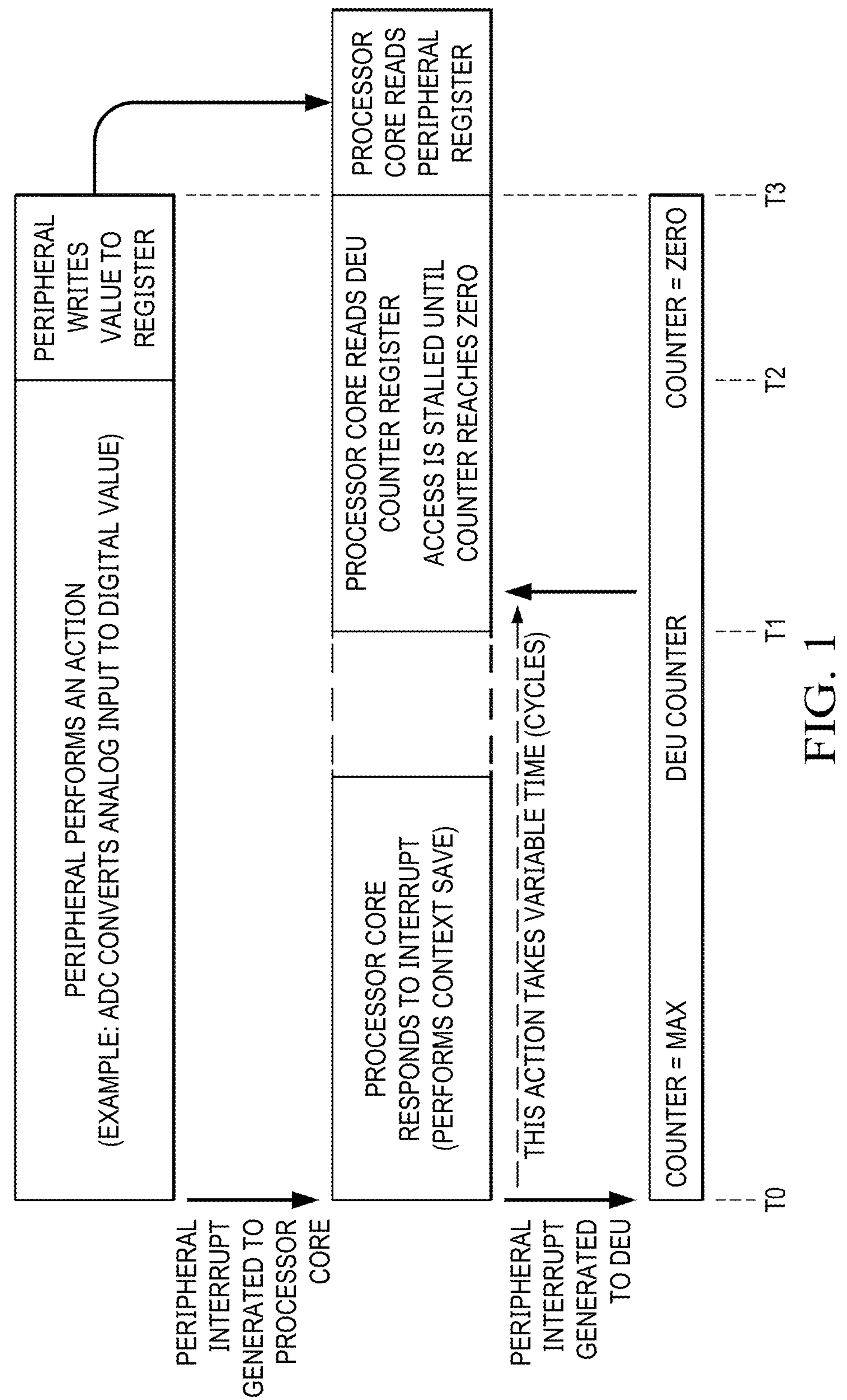
FIG. 1 shows an example timeline, according to various embodiments, for providing deterministic execution.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Various embodiments provide techniques to use hardware logic and hardware signals to stall a processor core of a central processing unit (CPU) for a set number of cycles, thereby providing deterministic execution times in some instances.

In one example embodiment, a hardware module may be configured to use a hardware or software trigger event to initiate a counter. The counter may be used to count a specified number of processor core clock cycles. In an instance in which the processor core performs a read to the counter, the hardware module may assert or de-assert a hardware signal to stall the processor core until the counter has expired. Once the counter has expired, the hardware module may change the state of the hardware signal to un-stall the processor core. In the examples below, the hardware module may be referred to as a deterministic execution unit (DEU).

In one example embodiment, the hardware module provides determinism from the time an interrupt occurs to the time of reading some type of input, such as a result of an analog-to-digital converter (ADC) read from a corresponding register, a measurement of a sensor read from a corresponding register, or the like. In another example embodiment, the hardware module provides determinism for the execution of a sequence of code that may have multiple paths. For example, a piece of code may have if/then/else branches that may take a different number of cycles based on the particular conditions when the piece of code is executed. Various embodiments may provide for a deterministic quantity of processor core clock cycles, regardless of the number of cycles taken for the code to complete or the peripheral device to complete.

In one example, application code performs a write of a value, such as a configuration parameter, to a peripheral register (PeriphRegA) where the value written (WRITE_VALUE1/2/3) is dependent on another variable (VarA). This may be written in C programming language as follows:

```
// Start Code:
if(VarA == 0)
   PeriphRegA = WRITE_VALUE1;
else if(VarA > 0)
   PeriphRegA = WRITE_VALUE2;
else if(VarA < 0)
   PeriphRegA = WRITE_VALUE3;
// End Code:
Rest Of Code...
```

For the above segment of code, the user may desire the total number of cycles it takes to execute the above (from Start Code to End Code) to be the same, irrespective of the path taken through the code. Normally, it is not possible for the user to control the total number of cycles. For example: if VarA==0 test is true, then WRITE_VALUE1 is written, and this may take 10 processor core clock cycles (from Start to End Code). If VarA>0 test is true, then WRITE_VALUE2 is written, and this may take 15 cycles (from Start to End Code). If VarA<0 test is true, then WRITE_VALUE3 is written, and this may take 20 cycles (from Start to End Code). However, the application in this case may benefit if the number of cycles executed would be 20 for all possible paths through the code.

If the DEU unit is available, the user may add the DEU_Start(20) function at the beginning and the DEU_Read( ) function at the end:

```
// Start Code:
DEU_Start(20);
if(VarA == 0)
   PeriphRegA = WRITE_VALUE1;
else if(VarA > 0)
   PeriphRegA = WRITE_VALUE2;
else if(VarA < 0)
   PeriphRegA = WRITE_VALUE3;
```

-continued

```
DEU_Read( );
// End Code:
Rest Of Code...
```

The DEU_Start(20) function may perform a write operation to the DEU unit counter register with the value 20. As soon as the write is performed, the DEU counter may start decrementing every processor core cycle (e.g., processor core clock cycle). At the end of the code, when the DEU_Read( ) function is executed, if the DEU counter has not reached the 0 value, the DEU will hold the processor core in a stalled state until the counter has reached 0, and then execution will be allowed to continue by un-stalling the processor core.

If for example VarA==0 had tested true, it would have taken 10 cycles to execute before the DEU_Read( ) would have occurred. The DEU counter would have had the value of (20−10)=10. The processor core would then have stalled for 10 cycles. If VarA>0 had tested true, it would take have taken 15 cycles to execute before the DEU_Read( ) would have occurred. The DEU counter would have had the value (20−15)=5. The processor core would then have stalled for 5 cycles. If VarA<0 had tested true, it would take have taken 20 cycles to execute before the DEU_Read( ) would have occurred. The DEU counter would have had the value (20−20)=0. The processor core would then have stalled for 0 cycles. Therefore, regardless of the path taken, execution of Rest Of Code will start after 20 cycles have expired, regardless of the path taken in the code.

Various embodiments may provide potential advantages over other solutions. For instance, some embodiments may allow for a result value to be read from a register according to a preprogrammed quantity of clock cycles. Such embodiments may synchronize a processor core and a peripheral to ensure that the results read from the register are, indeed, the correct values and not values read prematurely before the peripheral has a chance to write the values. Furthermore, during development time, a developer may use a debug tool or other tool to determine an appropriate quantity of clock cycles for the counter, thereby avoiding using too large a value (which would stall the processor core for longer than necessary) and avoiding too small a value (which might result in incorrect data read from the register). Generally, various embodiments may allow for a piece of code to be executed according to a preprogrammed quantity of clock cycles, which facilitates real-time processing.

By contrast, some solutions might insert no operations (NOOPs) into a portion of code to extend a quantity of cycles that the portion of code would use to execute. However, assuming that the portion of code may be indeterminate, adding NOOPs just increases an amount of clock cycles on top of an indeterminate time. In other words, the total number of clock cycles is still indeterminate. However, the DEU described herein may allow for the total amount of time to be deterministic, thereby avoiding too small a number of clock cycles or too large a number of clock cycles.

FIG. 1 shows an example timeline 100, according to various embodiments, for providing deterministic execution. The example of FIG. 1 illustrates operation in response to an interrupt generated by a peripheral device. Examples of peripheral devices include analog-to-digital converters (ADCs) that write to a register, sensors that write to a register, pulse width modulation (PWM) generators that write to a register, and the like. The scope of implementations is not limited to any particular peripheral devices.

At time T0, the peripheral device generates an interrupt to the processor core. Also at time T0, the DEU (e.g., as in FIG. 2) receives the interrupt as well and initiates the counter. For instance, initiating the counter may include populating the counter with a value specifying a quantity of clock cycles to be counted. The value may correspond to a time taken by the peripheral device to perform a task (e.g., a duration of a conversion cycle of an ADC or a duration of a sensing cycle of a sensor). The counter may be populated from another counter, such as a counter that is written at initialization of the device to store the quantity of cycles to be counted. Hardware logic in the DEU may then populate the counter and begin counting in response to receiving the interrupt.

Continuing with the example, the peripheral device performs an action. In the case of an ADC, during a conversion cycle, the ADC may receive a signal, sample the signal, and generate digital bits from the signal. In the example of a sensor, during a sensing cycle, the sensor may have a transducer that reacts to a phenomenon and generates digital bits based on the phenomenon. A PWM device may generate digital bits from control input, where the digital bits may define, e.g., a duty cycle. In any event, the peripheral device, in this example, takes from time T0 to time T2 before it has results ready to be accessed by the processor core (e.g., before the peripheral device writes bits to a register).

Concurrently, the processor core responds to the interrupt, such as by performing a context save and running an interrupt handler. In this example, the processor core response may take an indeterminate number of clock cycles, so that the number of clock cycles between time T0 and time T1 may be variable in some instances. The variation may arise from the particular context to be saved or other parameters.

Also concurrently the DEU includes a counter, as mentioned above. The counter begins decrementing from the specific value with which it was populated. In this example, the counter has not yet reached a specified value (zero in this example) at time T1. In other words, at time T1, the processor core has saved context and run the interrupt handler and is otherwise ready to read the register to which the peripheral device is programmed to write. However, as noted above, the peripheral device has not yet written to the register.

Various embodiments may cause the processor core to read the DEU counter register. For instance, the processor core may execute a machine code instruction directing a read operation from the processor core toward the counter. At time T1, the counter register has not yet reached zero. In response to the read operation, hardware logic in the DEU determines the value stored in the counter register (the non-zero value) and then determines whether to change a state of a hardware signal based at least in part upon the value stored in the counter register. In this case, since the DEU counter register has not yet reached zero, the hardware logic of the DEU determines to change a state of the hardware signal to cause the processor core to stall at time T1.

Continuing with the example, the hardware logic of the DEU maintains the state of the hardware signal to cause the processor core to stall until the counter reaches zero at time T3. Since time T3 is based upon a preprogrammed number of clock cycles, the time elapsed between time T0 and time T3 is deterministic and known ahead of time. In fact, in this example, during development time the quantity of clock cycles is preprogrammed to be no shorter than a maximum quantity of clock cycles it would generally be expected to take for the peripheral device to perform the action and complete its write operation to the register.

Once the counter reaches zero, the hardware logic of the DEU module changes the state of the hardware signal, thereby un-stalling the processor core. The processor core then continues processing, which in this example includes reading from the peripheral register. Note that in this example, the processor core reads from the peripheral register no earlier than time T3 (and no later than time T3). Thus, the peripheral device is given an appropriate amount of time to write to the peripheral register, and the processor core reads the peripheral register no earlier than a time at which the peripheral device's write operation has been completed.

Figure 2:
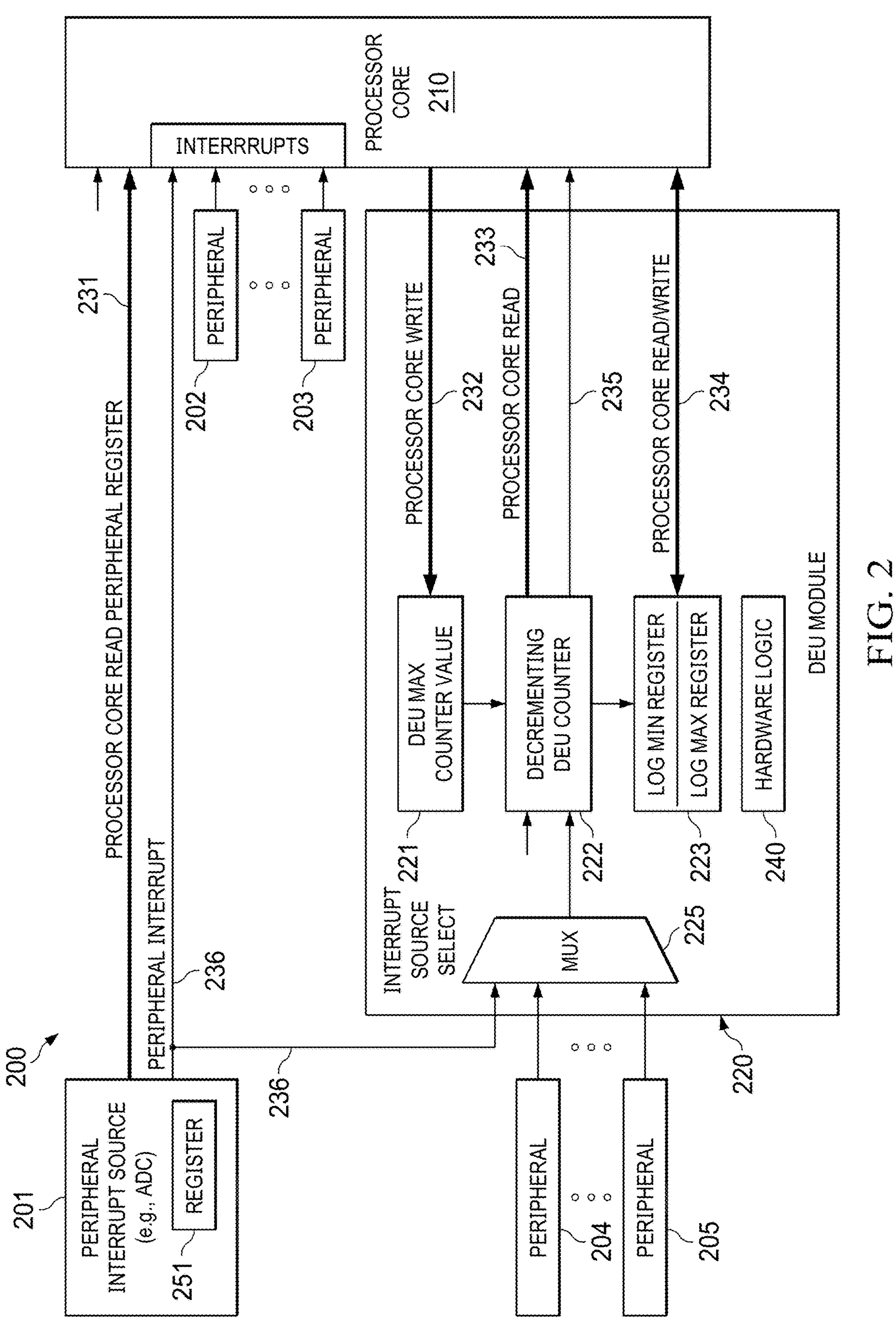
FIG. 2 is an illustration of an example hardware architecture, for providing deterministic execution, such as in the timeline of FIG. 1, according to various embodiments.

FIG. 2 is an illustration of an example hardware architecture 200, for providing deterministic execution, such as in the timeline of FIG. 1, according to various embodiments.

Hardware architecture 200 includes a peripheral device 201, such as an ADC or other appropriate peripheral. Architecture 200 also includes processor core 210, which may be any appropriate processor, such as a general-purpose processor, an application specific integrated circuit (ASIC), a graphics processing unit (GPU), or the like. DEU module 220 is in communication with the processor core 210 via buses 232-235.

The processor core 210 is coupled to a multitude of peripheral devices 201-205. Some of the peripheral devices may not have a real-time constraint, whereas other ones of the peripheral devices may have real-time constraints. For instance, peripheral devices 201, 204, and 205 may have real-time processing requirements and, thus, may be coupled to the processor core through the DEU module 220. On the other hand, peripheral devices 202-203 may be less time sensitive and may, thus, not be coupled to the DEU module 220.

Peripheral device 201 includes a register, such as a peripheral register 251, as described above with respect to FIG. 1. The processor core 210 may read the peripheral register 251 via bus 231. The processor core may write to the DEU max counter value register 221 via bus 232 and may read from the decrementing counter 222 via bus 233. The minimum and maximum registers 223 may be read from and written to by the processor core 210 via bus 234. Bus 235 may carry a hardware signal to stall and un-stall the processor core 210.

DEU module 220 may be implemented using fixed-purpose (i.e., hardcoded) circuitry and/or programmable circuitry and includes hardware logic 240, which controls the operation of DEU module 220. For instance, the hardware logic 240 may cause the decrementing counter 222 to be populated by the value from the DEU max counter register 221 and may also cause the hardware signal on bus 235 to attain a desired state (e.g., high or low), among other functionality.

DEU module 220, peripheral device 201, and processor core 210 may generally follow the timeline discussed above with respect to FIG. 1. For instance, the peripheral device 201 may generate an interrupt signal on bus 236 at time T0. In response to receipt of the peripheral interrupt signal, the processor core begins responding to the interrupt, such as performing context save and executing a peripheral handler. Further, in response to receipt of the peripheral interrupt signal, the DEU module initiates the counter 222 by populating the counter 222 with the value stored in max counter register 221.

The decrementing counter 222 continues to decrement, as defined by cycles of the processor core clock (clk). Concurrently, the peripheral device 201 performs its actions to generate and store digital data as the processor core 210 executes machine code instructions to handle the interrupt. There is a machine code instruction that causes the processor core 210 to perform a read operation directed to the decrementing counter 222 once the processor core is ready to read data from the peripheral register 251 at time T1. The hardware logic 240, in response to the read operation, determines that the decrementing counter 222 is still counting (i.e., has not yet reached the specified value, zero) and then asserts the hardware signal on bus 235 also at time T1 or immediately following time T1. When the hardware signal on bus 235 is asserted, the processor core detects the assertion and stalls in response to the assertion from time T1 to time T3. Sometime between time T1 and time T3, the peripheral device 201 finishes its operation by writing a digital value to its peripheral register 251 at time T2.

Once the decrementing counter reaches the specified value of zero at time T3, the hardware logic 240 changes the state of the hardware signal on bus 235 so that the signal is de-asserted and causes the processor core 210 to un-stall. In this example, when the processor core 210 stalls, it pauses executing machine code instructions, and when it un-stalls, it resumes executing machine code instructions. Further in this example, as the signal on bus 235 is de-asserted, the processor core 210 resumes executing machine code instructions that causes the processor core to read a value from the peripheral register 251 via bus 231.

Of course, the scope of implementations is not limited to a high signal causing the processor core 210 to stall and a low signal causing the processor core 210 to un-stall. Rather, any appropriate value may be transmitted as the hardware signal on bus 235, and that value may be programmed at the processor core 210 to cause any appropriate action. For instance, the hardware signal on bus 235 may be active high or active low, as appropriate.

Some embodiments may write a value to the minimum and maximum registers 223 in response to the processor core 210 read operation directed to the decrementing counter 222. This value indicates when the processor core 210 was ready to read the peripheral register 251, whether or not the decrementing counter 222 was ready to permit the read. Specifically, the hardware logic 240 may write the value from decrementing counter 222 into the minimum and maximum registers 223 upon the read operation on bus 233. In one example, when a value in decrementing counter 222 is a non-zero value that is lower than any value stored in minimum and maximum registers 223, then the previously low value may be replaced with the current value. Continuing with the example, when a value in decrementing counter 222 is a non-zero value that is higher than any value stored in minimum and maximum registers 223, then the previously high value may be replaced with the current value.

In this way, the minimum and maximum registers 223 may store a minimum value and a maximum value encountered during the processor core read operation. Such information may be useful to a developer during development time to set the max counter value appropriately high to avoid a premature read attempt of the peripheral register 251. Specifically, the developer may use the maximum value in the minimum and maximum registers 223 to understand a likely high value and how that high value compares to a known number of cycles associated with operation of the peripheral device 201. Assuming that the high value is below the known number of cycles associated with operation of the peripheral device 201, then that indicates that implementing a stall using DEU module 220 may be beneficial.

The development phase may include determining an appropriate max counter value for register 221 and then writing appropriate machine code instructions and data values to a boot loader (not shown). The boot loader, at initialization, may effect various configurations, such as loading the value into max counter value register 221. Similarly, the development phase may determine appropriate max counter values for multiple different peripheral devices (e.g., peripherals 204-205) and may write machine code instructions and data values to the boot loader in a similar manner just as for peripheral 201.

Furthermore, the scope of implementations is not limited to a decrementing counter 222. Rather, some implementations may use an incrementing counter, which starts at a specified value, such as zero, and increments toward the value stored in max counter value register 221. The hardware logic 240 may track the values in register 221 and the incrementing register (not shown) and may stall the processor core 210 between a time when the processor core 210 issues a read on bus 233 and the time at which the incrementing counter is still counting. Once the incrementing counter has reached the value stored in the max counter value register 221, then the hardware logic 240 may change the state of the signal on bus 235 to un-stall the processor core 210.

Additionally, some implementations may include multiplexing functionality 225 to multiplex among peripherals 201, 204, 205. However, other implementations may devote a unique copy of the max counter value register 221, the decrementing counter 222, and the minimum and maximum registers 223 to each different peripheral device having an associated and different max counter value. For instance, various peripheral devices may use a different quantity of clock cycles between times T0 and T2, and those different quantities of clock cycles would be reflected in different DEU max counter values of register 221. However, some peripherals may use a same quantity of clock cycles, and those peripherals may be amenable to multiplexing functionality 225. By contrast, peripherals associated with different DEU max counter values of register 221 may include their own DEU modules or, at the very least, their own registers 221, counters 222, and registers 223 to account for the different number of cycles to be counted.

Figure 3:
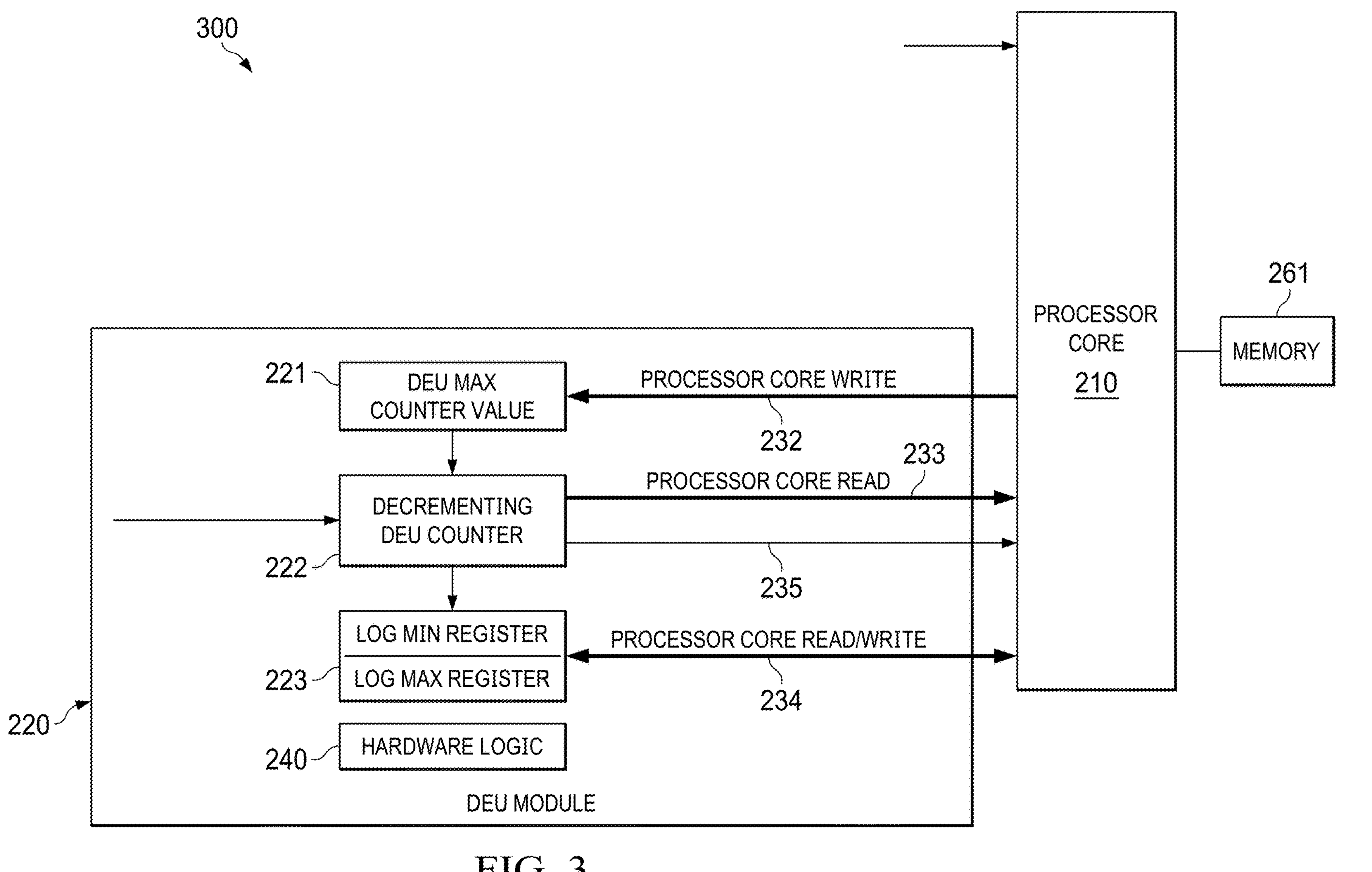
FIG. 3 is an illustration of an example hardware architecture, according to various embodiments.

FIG. 3 is an illustration of an example hardware architecture 300, according to various embodiments. Hardware architecture 300 is similar to hardware architecture 200 of FIG. 2, though architecture 300 is simplified to illustrate a software trigger embodiment.

In some examples, software code executed by processor core 210 may include a machine code instruction, read from non-transitory memory 261, configured to perform a write operation to the max counter value register 221 via bus 232. In other words, in the present example, the max counter value register 221 is populated by a write operation from processor core 210 rather than by a bootloader at initialization, such as in the example of FIG. 2.

Continuing with the example, the hardware logic 240 may recognize that a value has been written to max counter value register 221, and hardware logic 240 may in response populate decrementing counter 222 with the max counter value. The decrementing counter 222 continues to count from the max counter value from register 221 to a specified value, such as zero.

In the meantime, processor core 210 may continue executing a sequence of code, which eventually includes a read operation directed at the decrementing counter 222 via bus 233. The hardware logic 240 detects the read operation, determines whether the value currently stored in the decrementing counter 222 has reached a specified value (e.g., zero). In a case in which the decrementing counter 222 has a non-zero value indicating that the decrementing counter 222 is still counting, then the hardware logic may cause the hardware signal on bus 235 to attain a state to stall the processor core 210. The hardware logic may then continue to monitor the value in decrementing counter 222 and then change the state of the hardware signal on bus 235 to un-stall processor core 210 once the decrementing counter 222 reaches the specified value.

The value that the processor core 210 writes to the max counter value register 221 in this example determines the amount of time that the processor core takes from the beginning of a portion of code until starting a next portion of code. Specifically, the processor core 210 may stall, under direction of hardware logic 240, for a preprogrammed amount of time, therefore providing deterministic execution time. An example operation is given by the pseudocode below:

```
....
DEU_Write_Counter(#DEU_Max_Counter_Value);
User Critical Code
....
User Critical Code
DEU_Read_Counter( );
Rest of Code
```

In the example pseudocode above, and instruction (DEU_Write_Counter), when executed by the processor core 210, causes the processor core 210 to write a value to the register 221. The hardware logic 240 then writes the value from register 221 to the counter 222, thereby initializing the counter 222. The counter continues to count. The processor core 210 executes the code (User Critical Code) and reaches a machine code instruction causing a read operation (DEU_Read_Counter) directed to counter 222. Of note is that the code (User Critical Code) may include one or more branching instructions, which may make the expected number of cycles attributable to the code vary depending upon conditions and parameters. In other words, there may be an expected minimum number of cycles and an expected maximum number of cycles, attributable to various permutations of branching operations. The DEU_Write_Counter value may be configured during design time to be at least as large as that expected maximum number of cycles.

Hardware logic 240 detects the read operation and, assuming counter 222 has not finished counting, causes processor core 210 to stall by the hardware signal on bus 235. Once the counter 222 finishes counting, hardware logic 240 changes the state of the hardware signal on bus 235, thereby un-stalling processor core 210. processor core 210 then continues executing machine code instructions, beginning with Rest of Code.

As shown above in the pseudocode, the quantity of processor core clock cycles between the write operation to register 221 and the resumption of execution at Rest of Code is known and is determined by the value stored in register 221. In other words, the time is determinative.

As noted above with respect to FIG. 2, some implementations may use an incrementing counter rather than a decrementing counter as appropriate. The same is true with the implementation of FIG. 3. Similarly, the minimum and maximum registers 223 may be populated and used in the same manner as discussed above with respect to FIG. 2.

The hardware architectures of FIGS. 2 and 3 may be built in any appropriate manner. For instance, the processor core 210, DEU module 220, and various peripheral devices, such as peripheral device 201, may be built on a semiconductor die and packaged in a semiconductor package. For instance, the various hardware items shown in FIGS. 2 and 3 may be implemented as a system on-chip (SOC) or may be implemented on any of a variety of separate semiconductor chips. In one example, the hardware architectures of FIGS. 2 and 3 may be implemented in an embedded system, such as may be used in an automotive application, an industrial machine application, a sensor application, and/or the like. However, the scope of implementations is not limited to any specific end-use application.

Furthermore, the hardware signal on bus 235 may include an electrical signal that may vary between a high value or a low value and is carried on one or more conductors of the bus 235. Hardware logic, such as various logical gates, may cause the electrical signal to take on a high value or a low value, and further hardware logic at processor core 210 may receive the high or low electrical signal from the conductors and perform an action in response thereto. Additionally, the hardware logic 240 may generate the hardware signal on bus 235, in some instances, without influence by software operations, and the processor core 210 may receive the hardware signal on bus 235 and stall or un-stall without influence by software operations.

Figure 4:
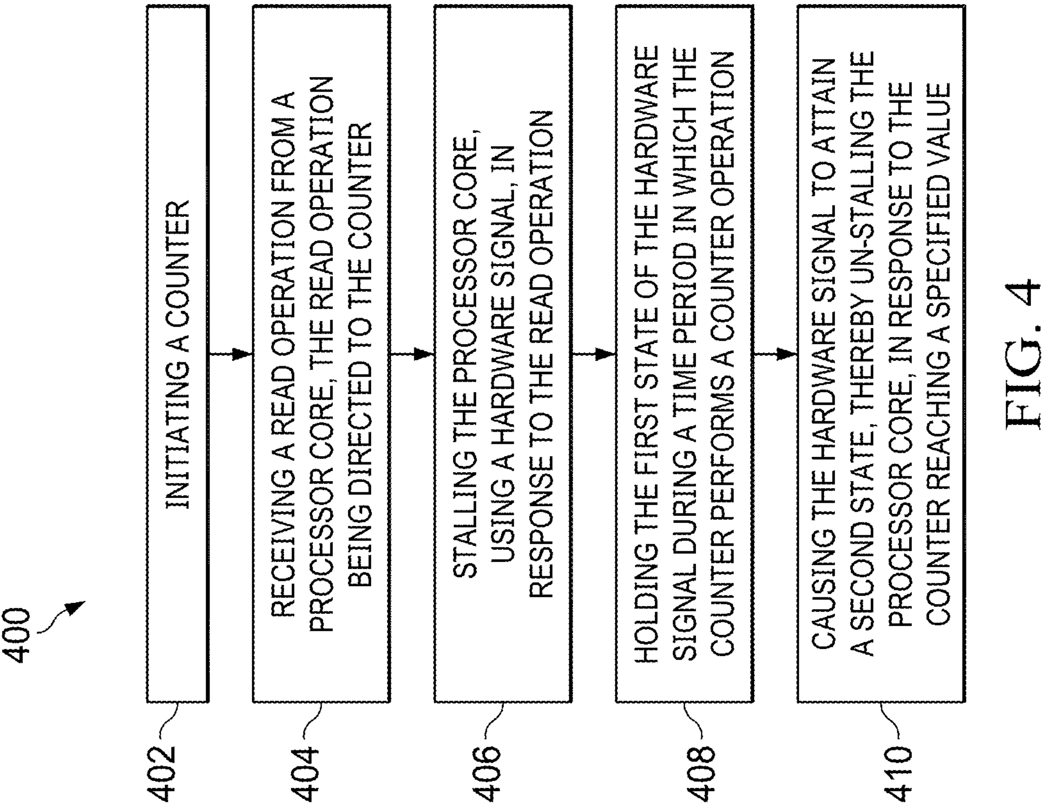
FIG. 4 is an illustration of an example method, which may be performed by a module having hardware logic, such as the DEU module having hardware logic of FIGS. 2 and 3, according to some embodiments.

FIG. 4 is an illustration of an example method 400, which may be performed by module having hardware logic, such as DEU module 220 having hardware logic 240, according to some embodiments.

Action 402 includes initiating a counter. In an example of applying deterministic execution to an interrupt scenario, initiating a counter may include starting a counter to count in response to receiving an interrupt signal. In the example of FIG. 2, the interrupt signal may cause hardware logic 240 to populate counter 222 with a value stored in max counter value register 221. The counter 222 may then decrement. However, in an example in which counter 222 increments, rather than decrements, action 402 may include starting the counter to count in response to receipt of the interrupt signal. In any event, in this example of applying deterministic execution to an interrupt, the value stored in the max counter value register 221 may be set during initialization.

In an example of applying deterministic execution to application code, action 402 may include the processor core executing a machine code instruction that stores a counter value to max counter value register 221, and hardware logic 240, in response, may then cause the counter to either increment or decrement as appropriate. Of note in the example of applying deterministic execution to application code, the max counter value is set by the processor core executing application code, rather than at initialization.

Action 404 includes receiving a read operation from a processing unit. In the examples of FIGS. 2 and 3, the processor core 210 executes a machine code instruction to cause processor core 210 to issue a read operation directed at a register implementing counter 222. Of note is that the read operation of action 404 is directed not to the register associated with a peripheral device (e.g., peripheral device 201) but rather to a different register (e.g., counter 222) that is associated with DEU module 220 and hardware logic 240.

Action 406 includes stalling the processor core using a hardware signal. For instance, the hardware logic, such as hardware logic 240, may detect the read operation of action 404. In response, the hardware logic may then cause a hardware signal, such as the hardware signal on bus 235, to attain a particular value. The particular value is configured to cause the processor core to pause execution of machine code instructions. In the present example, the hardware signal on bus 235 is generated by hardware logic and received by hardware logic (not shown) at the processor core 210. The actions of DEU module 220 in some implementations may omit any functionality associated with software and may, instead, be provided by hardware. Furthermore, the stall and un-stall action of processor core 210 may be performed by hardware logic as well, where that hardware logic receives the signal on bus 235. An advantage of using hardware logic to stall and un-stall the processor core is that it may be performed in a relatively short quantity of clock cycles (e.g., one clock cycle) and may be deterministic itself. In other words, hardware logic may avoid any latency that might be associated with software or firmware execution. However, the scope of implementations does not exclude the use of software or firmware.

Additionally, in some embodiments, stalling the processor core at action 406 may include stalling all execution of machine code instructions. However, in other embodiments, the processor core may include multiple cores, and stalling may include stalling one core, associated with the read operation of action 404, while allowing other cores to operate normally. Furthermore, some processor architectures may allow for execution of multiple threads, and stalling the processor core at action 406 may include pausing execution of a thread associated with the read operation of action 404, while allowing other threads to be executed as appropriate. In other words, the scope of implementations may be adapted to the capabilities and sophistication of the processing unit.

Action 408 includes holding the first state of the hardware signal during a time period in which the counter performs a counter operation. In this example, the read operation of action 404 is received by the hardware logic before the counter has reached a specified number. As noted above, the specified number may be stored to max counter value register 221, and the specified number may correspond to a number of processor core clock cycles from the counter being initiated until resumption of execution of machine code instructions by the processor core.

The specified number may be determined during development time. Specifically, a developer may use a debugger or other appropriate tool to determine an appropriate deterministic time period. For instance, the deterministic time period may correspond to an expected maximum quantity of processor core clock cycles that it would take for a peripheral device to perform an action and write data to a register. In another example, the deterministic time period may correspond to an expected maximum quantity of processor core clock cycles that it would take for a piece of code to execute, taking into account various permutations of branching that may occur.

Action 410 may include causing the hardware signal to attain a second state. For instance, if the first state causes the processor core to stall, the second state may be configured to cause the processor core to un-stall. Action 410 may be performed in response to the counter reaching a specified value. For instance, hardware logic 240 may track the value of the counter and may perform action 410 in response to the value of the counter reaching a specified value.

The scope of implementations is not limited to the series of actions shown in FIG. 4. Rather, various embodiments may add, omit, rearrange, or modify various actions. In one example, the processor core may perform a read operation on a peripheral register 251, subsequent to action 410. Further, in some implementations, there may be an initialization process that populates a value into register 221, previous to action 402.

Various embodiments may include a processor having: an interrupt controller and an execution pipeline. The interrupt controller may be configured to handle interrupts, and the execution pipeline may be configured to execute machine code instructions. The interrupt handler may be configured to receive interrupts, such as on bus 236 of FIG. 2, and the execution pipeline may be configured to execute machine code instructions to cause the processor core to perform the read and write operations associated with buses 232, 233, 234.

Various embodiments may also include a hardware module having: a first register configured to store a counter value, a second register configured to receive a value from the first register and to either increment or decrement to a specified value, and hardware logic configured to stall and un-stall a processing unit in response to a value stored in the second register and in response to read and/or write operations received on a bus from the processing unit.

Various embodiments may also include a non-transitory computer readable medium storing a computer program comprising sets of computer readable instructions for execution by a computer processor, wherein the computer program is such that, when the sets of computer readable instructions are executed by the processor, the processor is caused to perform the processor core actions described above with respect to FIGS. 1-3 (e.g., performing read and write operations, handling interrupts).

The term "semiconductor die" is used herein. The semiconductor die may include an integrated circuit with hundreds or thousands of transistors coupled to form a functional circuit, for example a microprocessor or memory device. The semiconductor device may also be referred to herein as a semiconductor device or an integrated circuit (IC) die.

The term "semiconductor package" is used herein. A semiconductor package has at least one semiconductor die electrically coupled to terminals and has a package body that protects and covers the semiconductor die. In some arrangements, multiple semiconductor dies can be packaged together. For example, a power metal oxide semiconductor (MOS) field effect transistor (FET) semiconductor device and a second semiconductor device (such as a gate driver die, or a controller die) can be packaged together to form a single packaged electronic device. Additional components such as passive components, such as capacitors, resistors, and inductors or coils, can be included in the packaged electronic device. The semiconductor die is mounted with a package substrate that provides conductive leads. A portion of the conductive leads form the terminals for the packaged device. In wire bonded integrated circuit packages, bond wires couple conductive leads of a package substrate to bond pads on the semiconductor die. The semiconductor die can be mounted to the package substrate with a device side surface facing away from the substrate and a backside surface facing and mounted to a die pad of the package substrate. The semiconductor package can have a package body formed by a thermoset epoxy resin mold compound in a molding process, or by the use of epoxy, plastics, or resins that are liquid at room temperature and are subsequently cured. The package body may provide a hermetic package for the packaged device. The package body may be formed in a mold using an encapsulation process, however, a portion of the leads of the package substrate are not covered during encapsulation, these exposed lead portions form the terminals for the semiconductor package. The semiconductor package may also be referred to as a “integrated circuit package,” a “microelectronic device package,” or a “semiconductor device package.”

While various examples of the present disclosure have been described above, it should be understood that they have been presented by way of example only and not limitation. Numerous changes to the disclosed examples can be made in accordance with the disclosure herein without departing from the spirit or scope of the disclosure. Modifications are possible in the described embodiments, and other embodiments are possible, within the scope of the claims. Thus, the breadth and scope of the present invention should not be limited by any of the examples described above. Rather, the scope of the disclosure should be defined in accordance with the following claims and their equivalents.

What is claimed is:

1. An apparatus comprising:

a processor core configured to execute machine code instructions over a plurality of clock cycles and to receive a hardware signal; and a circuit coupled to the processor core, wherein the circuit includes a counter, wherein the circuit is configured to generate the hardware signal and is further configured to:

change a value stored in the counter by either incrementing or decrementing the value according to a clock associated with the clock cycles;

receive a read operation, directed to the counter, from the processor core;

in response to receiving the read operation, determine the value stored in the counter;

determine whether to change a state of the hardware signal based at least in part upon the value stored in the counter;

change the state of the hardware signal to a first state; and change the state of the hardware signal to a second state in response to the value stored in the counter being equal to a specified value; and wherein the processor core is further configured to:

stall in response to the state of the hardware signal being changed to the first state;

read a first register, associated with a peripheral device, in response to the second state of the hardware signal.

2. The apparatus of claim 1, wherein the processor core is further configured to: resume execution of the machine code instructions in response to the second state of the hardware signal.

3. The apparatus of claim 1, wherein the circuit is further configured to populate the counter from a second register in response to detecting an interrupt from the peripheral device.

4. The apparatus of claim 3, wherein the second register is configured to store a non-zero value, and wherein the counter is configured to decrement the non-zero value with each clock cycle.

5. The apparatus of claim 3, wherein the second register is configured to store a non-zero value, and wherein the counter is configured to increment from zero with each clock cycle to the non-zero value.

6. The apparatus of claim 1, wherein the processor core is further configured to: populate a second register with a non-zero value during runtime, and wherein the counter is configured to decrement the non-zero value with each clock cycle.

7. The apparatus of claim 1, wherein the processor core is further configured to: populate a second register with a non-zero value during runtime, and wherein the counter is configured to increment from zero to the non-zero value with each clock cycle.

8. The apparatus of claim 1, wherein the circuit is further configured to:

populate a second register with a first value stored in the counter corresponding to a time at which the read operation is received from the processor core.

9. A method comprising:

initiating a counter;

receiving a read operation from a processor core, wherein the read operation is directed to the counter;

stalling the processor core, including causing a hardware signal to attain a first state, in response to the read operation from the processor core, wherein the hardware signal is transmitted on a bus from a hardware logic unit to the processor core;

holding the first state of the hardware signal during a time period in which the counter performs a counter operation; and causing the hardware signal to attain a second state, thereby un-stalling the processor core, in response to the counter reaching a specified value; wherein initiating the counter is performed in response to detecting an interrupt signal from a peripheral, and wherein the method further comprises: reading a register associated with the peripheral subsequent to the hardware signal attaining the second state.

10. The method of claim 9, wherein reading the register associated with the peripheral comprises: reading the register associated with an analog-to-digital converter.

11. The method of claim 9, wherein reading the register associated with the peripheral comprises: reading the register associated with a sensor device.

12. The method of claim 9, wherein the counter operation comprises an incrementing operation.

13. A method comprising:

initiating a counter;

receiving a read operation from a processor core, wherein the read operation is directed to the counter;

stalling the processor core, including causing a hardware signal to attain a first state, in response to the read operation from the processor core, wherein the hardware signal is transmitted on a bus from a hardware logic unit to the processor core;

holding the first state of the hardware signal during a time period in which the counter performs a counter operation; and causing the hardware signal to attain a second state, thereby un-stalling the processor core, in response to the counter reaching a specified value; wherein initiating the counter includes receiving a write operation from the processor core during runtime, wherein the write operation is configured to store a non-zero value to the counter, wherein the non-zero value corresponds to a quantity of clock cycles of the processor core associated with the specified value.

14. The method of claim 13, wherein the read operation is associated with a sequence of code having multiple branches.

15. A method comprising:

initiating a counter;

receiving a read operation from a processor core, wherein the read operation is directed to the counter;

stalling the processor core, including causing a hardware signal to attain a first state, in response to the read operation from the processor core, wherein the hardware signal is transmitted on a bus from a hardware logic unit to the processor core;

holding the first state of the hardware signal during a time period in which the counter performs a counter operation;

causing the hardware signal to attain a second state, thereby un-stalling the processor core, in response to the counter reaching a specified value; and storing a value of the counter corresponding to a time at which the read operation is received, including replacing a previously stored value of the counter in response to the value of the counter being greater than the previously stored value or in response to the value of the counter being lesser than the previously stored value.

16. The method of claim 15, wherein the counter operation comprises an incrementing operation.

17. An apparatus comprising:

a hardware counter circuit, coupled to a first bus, wherein the first bus comprises a data bus configured to support read and write access to the hardware counter circuit from a processing unit;

hardware logic coupled to the hardware counter circuit and to a second bus, wherein the second bus is coupled to the processing unit, further wherein the hardware logic is configured to assert and de-assert a hardware signal on the second bus in response to a value of the hardware counter circuit at a read operation on the first bus;

a register configured to populate a value from the register to the hardware counter circuit to begin a counting operation; and a third bus, coupling the register to the processing unit, the third bus configured for read and write access of the register during runtime, including a write operation from the processing unit of a non-zero value corresponding to a quantity of clock cycles of the processing unit associated with the value.

18. The apparatus of claim 17, wherein the hardware logic further comprises:

an interrupt signal input coupled to a peripheral bus.

19. The apparatus of claim 18, wherein the hardware logic is further configured to:

populate a first value from the register to the hardware counter circuit in response to receiving an interrupt at the interrupt signal input.

20. The apparatus of claim 17, wherein the hardware logic is further configured to:

decrement the counter circuit from the non-zero value.

* * * * *